United States Patent [19]

Hwo

[11] Patent Number: 4,681,804
[45] Date of Patent: Jul. 21, 1987

[54] POLYBUTYLENE ROOM TEMPERATURE AGED FILM

[75] Inventor: Charles C. Hwo, Sugar Land, Tex.

[73] Assignee: Shell Oil Company, Houston, Tex.

[21] Appl. No.: 770,912

[22] Filed: Aug. 30, 1985

[51] Int. Cl.⁴ .............................................. B32B 27/00
[52] U.S. Cl. .................................... 428/349; 428/500; 428/516; 428/35
[58] Field of Search .......................... 428/516, 500, 35

[56] References Cited

U.S. PATENT DOCUMENTS

| | | | |
|---|---|---|---|
| 4,230,767 | 10/1980 | Isaka et al. | 428/349 |
| 4,302,504 | 11/1981 | Lansbury | 428/516 |
| 4,360,650 | 11/1982 | Desvignes et al. | 428/516 |
| 4,456,660 | 6/1984 | Colombo | 428/516 |

*Primary Examiner*—Edith Buffalow
*Attorney, Agent, or Firm*—Wendy K. B. Buskop

[57] ABSTRACT

A room temperature aged polymer film having good hot tack, low heat sealing temperature and high clarity for packaging which contains a polypropylene or polypropylene-based copolymer or blend as a substrate or core layer and a polymer blend as a surface layer, wherein the polymer blend comprises a butene-1-propylene copolymer with a propylene comonomer content of from about 10% by weight to about 25% by weight.

10 Claims, No Drawings

4,681,804

POLYBUTYLENE ROOM TEMPERATURE AGED FILM

BACKGROUND OF THE INVENTION

The present invention relates to a room temperature aged polymer film which has good hot tack, a low heat sealing temperature and high clarity. This invention addresses the unique problems associated with the film of such a polymer blend which has been room temperature aged. Polybutylene/polypropylene blends as oriented polypropylene (OPP) film heat sealing layers are known to lower the heat sealing temperature and give good hot tack strength during packaging. However, the room temperature aging of coated film normally results in an undesired increase in heat sealing temperature and deterioration of hot tack strength.

Hot tack is defined as the bonding strength between two pieces of polymer film at the point immediately after their having been joined together by application of heat and while the polymer is in semi-moltened/solidifying state. Films are often made into packages which are sealed by applying heat. The seal must retain sufficient strength to contain the materials within the package. Not only does the weight of the material or product contribute to a tendency for seals to release, but in addition, the pressure of air used to assist in transport of the product may exert additional pressure against the seal.

In addition to a good hot tack, a low heat sealing temperature is desired so that the film may be processed at a low temperature.

U.S. Pat. No. 4,230,767 discloses a packaging material with heat seal packaging properties composed of blends of a propylene/ethylene copolymer with a variety of other propylene olefins and copolymers. Propylene ethylene copolymers in '767 have an ethylene content of as low as 0.5% by weight. '767 does not disclose a film which, after room temperature aging, exhibits good hot tack and a low heat sealing temperature.

SUMMARY OF THE INVENTION

Applicants have surprisingly discovered a polybutylene/polypropylene polymer film which, after room temperature aging, overcomes the disadvantages of the known film heat sealing layers and exhibits all of the desired characteristics of a good seal coat film. This film has the combination of low heat sealing temperature as well as good hot tack and high clarity. In addition, the blend of the present film has good compatability with other materials, particularly polypropylene, and has good seal strength. Most importantly and surprisingly, this film exhibits good hot tack and low heat sealing temperature *even after room temperature aging.*

Applicants have surprisingly found that a particular polymer blend as a surface layer of a film can provide the layers with a low heat sealing temperature and good hot tack even after room temperature aging. The film comprises a polypropylene or polypropylene based copolymer or blend as a substrate or core layer and a polymer blend as a surface layer wherein the polymer blend is a butene-1-propylene copolymer having a propylene content of from about 10% by weight to about 25% by weight, preferably 17% by weight to about 23% by weight, most preferably, about 20% by weight. Preferably, the melt index of the butene-1 propylene copolymer is from about 0.25 to about 4.00. Applicants have found that the particular range of 10% by weight to about 25% by weight of the propylene content of the butene-1 copolymer is *critical* to the polymer blend of the butene-1 propylene copolymer in order to yield a film which possesses the excellent hot tack as well as the low heat sealing temperature and high clarity, even in spite of room temperature aging. Seal coatings may be used on films of polypropylene homopolymers, copolymers or polypropylene blends.

DETAILED DESCRIPTION OF THE INVENTION

Five butene-1-propylene ($C_4$-$C_3$) copolymers were compared. Three butene-1-propylene copolymers made with a Shell conventional catalyst, were evaluated on a small blown film line. As the $C_3$ content increased, the tensile strength and modulus of the film decreased and the processability became poorer. However, the tear strength and optical properties were improved with the increase in the $C_3$ content. Thus, an optimum $C_3$ content is between 11 and 21 mole percent for a balance in processability and properties. The 21% $C_3$ copolymer film had excellent clarity. The two $C_4$-$C_3$ copolymers made with the Shell super high activity catalyst (SHAC) were processed on a casting line, and films with gauges from 2 to 21 mils were obtained. The SHAC film resembles vinyl film in tensile properties and hardness.

EXPERIMENT 1

Blown Film Mechanical Properties $C_4$-$C_3$ copolymers (made with a Shell conventional catalyst) with $C_3$ comonomer content of 6, 11 and 21 mole percent were made in a 20 gallon PBBR and blended to the nucleated DP1700SA type formulation, i.e. 6.5% polypropylene (PP5520), 0.56% high density polyethylene (DuPont Alathon 7815 HDPE), 0.075% Oleamide (S), 0.3% Superfloss (A) and 0.08% Irganox 1010. Each $C_4$-$C_3$ copolymer was dry-mixed with WBS 113SA PP master-batch and 0.56% by weight HDPE, followed by compounding on the Stewart-Bolling mixer. The films were fabricated on a 1¼" Brabender extruder with a 2" blown film die with a standard air ring. Sheldahl B-308 polybag machine was used to seal the film for testing. Table 1 is a list of the mechanical properties, sealibility and processability of $C_4$-$C_3$ copolymers.

PP/DP 1700 SA and XP801 are also included for comparison. As shown in the table, the $C_4$-$C_3$ copolymer at 11 mole % of $C_3$ resembles PB DP 1700 SA mechanical properties and processability. As the $C_3$ increases to 21 mole %, excellent clarity of the film was observed. Optimum $C_3$ content exists between 11 and 21 mole % for balance in processability and properties.

TABLE I
PROPERTY AND PROCESSABILITY COMPARISON OF POLYBUTYLENE BLOWN FILMS

|  |  | PB DP1700SA[a] (Lot 4CTF12) | XP801[b] (WBS-084, Box 10) | $C_4=-C_3=$ COPOLYMER[c] (LR 14974-45) | $C_4=-C_3=$ COPOLYMER[c] (LR 14974-57) | $C_4=-C_3=$ COPOLYMER[c] (LR 14974-63) |
|---|---|---|---|---|---|---|
| $C_2=$ CONTENT (W %), IR (uncorrected) | | 0.5 | 3.3 | — | — | — |
| $C_3=$ CONTENT (M %), NMR | | — | — | 6 | 11 | 21 |
| MECHANICAL | | | | | | |
| Elemdorf Tear, | MD | 556 | 357 | 569 | 780 | 610 |
| (g/mil) | TD | 847 | 398 | 189 | 932 | 740 |
| Tensile Break, | MD | 5,030 | 3,990 | 7,120 | 6,840 | 3,710 |
| (psi) | TD | 4,130 | 3,260 | 1,620 | 3,570 | 1,580 |
| Yield Strength, | MD | 1,950 | 910 | 2,160 | 1,460 | 1,220 |
| (psi) | TD | 1,910 | 780 | 1,460 | 1,360 | 930 |
| % Elongation | MD | 245 | 370 | 140 | 224 | 340 |
| | TD | 272 | 354 | 153 | 212 | 206 |
| Film Dart Impact, f 50, g/mil (@ 26") | | 145 | 303 | — | — | — |
| Tangent Modulus | MD | 36,040 | 17,900 | 50,400 | 29,400 | 13,115 |
| (psi) | TD | 33,760 | 17,400 | 41,000 | 33,100 | 16,758 |
| SEALABILITY | | | | | | |
| Seal Dart Impact f 50, g/mil (@ 26") | | 10 | 118 | <10 | 17 | 23 |
| Seal Temperature Range (°F.) | | 360–450 (@ 3 mils) | 450–525 (@ 2–5 mil) | — | — | 260–400 (@ 2–5 mil) |
| Seal Break Strength (psi) | | 2,700–3,600 | 1,680–2,800 | — | — | 1,750–1,630 |
| OPTICAL | | | | | | |
| Haze, % | | 25 (@ 3 mils) | 21 (@ 5 mils) | 40 (@ 2 mils) | 21 (@ 2 mil) | 8.3 (@ 3.5 mils) |
| Clarity, %- | | 2.5 | 0.1 | 0.2 | 2.5 | 10.1 |
| PROCESSABILITY[d] | | | | | | |
| Line Speed, fpm | | 3–4 | 2 | 4–5 | 3–4 | 3 |
| Film Gauge, mil | | 2–3.5 | 2–5 | 1.5–3.5 | 2–4 | 1.5–5 |
| Blow-Up Ratio | | 2.0 | 2.0 | 2.0 | 2.1 | 2.0 |

NOTES:
[a] PB 8640 + 6.5 W % PP 5520 + 0.3% Superfloss + 0.075 W % Oleamide + 0.08 W % Organox 1010.
[b] Shell conventional catalyst produced XP801 + 6.5 W % PP 5520 + 0.4 W % Stearamid + 0.3% Superfloss + 0.075% Oleamide + 0.08% Irganox 1010.
[c] WRC's 20-gallon PBBR Shell conventional catalyst produced + 6.5 W % PP 5520 + 0.4 W % PP 5520 + 0.56 W % HDPE + 0.3 W % Superfloss + 0.075 W % Oleamide + 0.08 W % Organox 1010.
[d] Evaluation was made at the 1¼" small blown film line with a 2" die and a Brabender (poorly designed) air ring.

EXPERIMENT 2

Cast Film Mechanical Properties

SHAC $C_4$-$C_3$ copolymers at a C3 content of 3.5 mole % and 10.4 mole %, and a melt index of 0.92 and 1.22 dg/min were made in a 20 gallon PBBR and compounded similarly to the formulation above, excluding the HDPE, for the cast film evaluation. Additional polypropylene and nucleating agents were added to make extrusion of cast film possible. The formulation and processing conditions for the cast film application screening of SHAC $C_4$-$C_3$ copolymer is tabulated in Table 2. A vinyl shower curtain obtained from the supermarket was used for the purpose of comparison.

Table 2 shows the physical properties of the cast film obtained from a small casting line. The tensile and elongation properties indicate that the SHAC compound and the plasticized vinyl shower curtain (the control) are comparable. The SHAC compound is somewhat stiffer than the vinyl shower curtain control and thus a plasticizer may be used to reduce the stiffness of the SHAC $C_4$-$C_3$ copolymers.

TABLE 2
PHYSICAL PROPERTIES, COMPOUND FORMULATION, AND PROCESSING CONDITION OF SHAC- $C_4=-C_3=$ COPOLYMER (10.4 m % $C_3=$)

| PHYSICAL PROPERTY TEST DATA | | | | | | |
|---|---|---|---|---|---|---|
| | TENSILE YIELD, PSI | | TENSILE @ BREAK, PSI | | ELONGATION @ BREAK, % | |
| TEST DETERMINED[1] | MD | TD | MD | TD | MD | TD |
| SAMPLE IDENTITY | | | | | | |
| SHAC @ 2–3 mil | 1010 | 860 | 2800 | 2360 | 325 | 440 |
| SHAC @ 6–9 mil | 910 | 880 | 3570 | 2780 | 540 | 510 |
| SHAC @ 16–21 mil | 1040 | 950 | 3110 | 3030 | 510 | 520 |
| Control Vinyl Shower Curtain[2] @ 5–6 mil | 1310 | 1140 | 4010 | 3310 | 275 | 295 |

| TEST DETERMINED[3] | STIFFNESS, PSI | HARDNESS SHORE, A (10 SEC.) | CLARITY |
|---|---|---|---|
| SAMPLE IDENTITY | | | |
| SHAC CMPD | 3,280 | 86 | Opaque |

TABLE 2-continued

PHYSICAL PROPERTIES, COMPOUND FORMULATION, AND PROCESSING CONDITION OF SHAC- $C_4=-C_3=$ COPOLYMER (10.4 m % $C_3=$)

| Vinyl Shower Curtain | 750 | 85 | Transparent |
|---|---|---|---|

[1] Tests determined on cast films.
[2] Material was from the end user - Hygiene Industries, New York, N.Y. Trade name = H.M.S. Shower Curtain Liner.
[3] Stiffness and hardness test data were performed on compression-molded plaques.

COMPOUND FORMULATION

| INGREDIENTS | % w | CONTRIBUTION SOURCE |
|---|---|---|
| SHAC Copolymer | 80.95 | PB Pilot Plant (20-Gallon) |
| Polypropylene 5520 | 5.66 | |
| Superfloss | 0.26 | |
| Kemamide U | 0.07 | PB Masterbatch |
| Irganox 1010 | 0.06 | |
| Polypropylene 5520 | 9.00 | Added to mix |
| Stearmide | 0.40 | 4% dual nucleant masterbatch |
| HDPE Alathon 7815 | 1.00 | |
| Polybutylene 0700 | 2.60 | |
| Total | 100.00 | |

CASTING LINE CONDITIONS

EXTRUDER ZONE TEMPERATURES: No. 1 @ 190, No. 2 @ 200, No. 3 @ 210, No. 4 @ 210

| EXTRUDER, RPM | FILM THICKNESS, mil | FILM WIDTH, inches |
|---|---|---|
| 15 | 3 | 3 |
| 25 | 5 | 3½ |
| 83 | 8 | 5 |
| 110 | 20 | 5½ |

Bath Circulation Water, °C. = 10
Casting Die = 6 inches set @ 1½ mil opening.

EXPERIMENT 3

Single Layer Cast Film Sealability and Optical Properties

All blends were compounded on a Banbury type mixer with a 1275 cc drop size and granulated on a Cumberland grinder using a 1¼" screen. The resin was then cast into film using the Brabender 1¼" extruder with a mixing screw and a 6" or 8" cast film die. The film was fabricated on a Killion 10" cast film chill roll which has a temperature range of about 50° F. to 150° F. The film was sealed at various temperatures within the sealing range beginning at about 10° F. after the film first sticks together and ending about 10° F. before the film melts. The seals were tested for tensile and hot tack strength according to the hot tack apparatus (a test by applying pressured air on to the sealed area while heat sealing on a bottom sealed of a specified dimension of film pouch). This hot tack test determines how much pressure the seal can withstand during package fabrication and simulates when the product is dispensed into the bag immediately after heat sealing. (For example, hot cereal). For certain product packaging, the required hot tack strength at a given seal temperature is 10" or above of water and the minimum tensile strength at a given seal temperature is 350 gms/in as set forth by one of the end users.

A $C_4$-$C_3$ copolymer at 21% $C_3$ and 1.3 MI, and a $C_4$-$C_3$ copolymer at 16% $C_3$ and 0.49 MI were compounded with 50% polypropylene PP 5520. PP5520 was chosen because it is a commercial grade having good flow match with the $C_4$-$C_3$ copolymer. Table 3 shows that the 21% copolymer was a clear film and had approximately a 40° lower sealing temperature in Run 1 than in Run 2. Thus, it was determined to evaluate a $C_4$-$C_3$ copolymer at 16% $C_3$ with approximately a 1.1 MI and a $C_4$-$C_3$ copolymer at 21% $C_3$ with approximately 0.5 melt index. These copolymers were blended at 50/50 level with PP5520 and the 75 PB/25 PP level with polypropylene PP 5083. The results are shown in Table 3 as 18CF, 19CF, 20CF and 21CF. Run 18CF was clear but not as good as Run 1. Run 19CF, however, gave a *super clear* film.

It can be concluded that the $C_4$-$C_3$ copolymer at 21 m% $C_3$=content and 1.1-1.3 MI appears to be the optimum in high seal strength, low heat seal initiation temperature and good optical property. Also, the amount of polypropylene appears to be optimum at 25 w%-50 w% level as at lower levels the blend would be hazy and too tacky to process and at higher levels, its sealing temperature would be too high and optical property is poorer. Table 3 also shows that there are three different grades of polypropylene, namely, Shell PP 5820, Shell PP DN 5083 and Shell PP DN 6016 which are favored for the blend. All the single layer films appear to have good hot tack strengths (15" water) over wide range of sealing temperatures.

TABLE 3

PROPERTIES OF CAST FILM FROM $C_4$-$C_3$ COPOLYMER/PP BLENDS[1]

| Sample No. | Property Blend Composition | Relative Clarity (Visual Inspection) | Heat Seal Strength, g/in Width[2] | | | | | | | | |
|---|---|---|---|---|---|---|---|---|---|---|---|
| | | | 140° F. | 150° F. | 160° F. | 170° F. | 180° F. | 190° F. | 200° F. | 220° F. | 240° F. |
| Run I | $C_4$-$C_3$ (21 m %, 1.3 MI)/ PP5520 (50/50) | Clear | | | 789 | 1180 | 1318 | — | 1537 | 1624 | 1706 |
| | | | | | 177 | 1277 | 1341 | — | 1565 | 1718 | |
| Run II | $C_4$-$C_3$ (16 m %, 0.49 MI)/PP5520 (50/50) | Hazy | — | — | 49 | — | 158 | — | 545 | 1324 | 1110 |
| 18 CF | $C_4$-$C_3$ (16 m %, 1.1 MI) PP5520 (50/50) | Clear | — | — | 41 | 103 | 166 | — | 775 | 786 | — |
| 2/CF | $C_4$-$C_3$ (21 m %, 0.5 MI)/ | Hazy | — | — | 43 | 66 | 147 | — | — | 1154 | — |

TABLE 3-continued

PROPERTIES OF CAST FILM FROM $C_4$-$C_3$ COPOLYMER/PP BLENDS[1]

| Sample No. | Property Blend Composition | Relative Clarity (Visual Inspection) | Heat Seal Strength, g/in Width[2] | | | | | | | | |
|---|---|---|---|---|---|---|---|---|---|---|---|
| | | | 140° F. | 150° F. | 160° F. | 170° F. | 180° F. | 190° F. | 200° F. | 220° F. | 240° F. |
| 20 CF | PP5520 (50/50) $C_4$-$C_3$ (21 m %, 0.5 MI)/ PP5520 (75/25) | Hazy | — | 67 | 543 | 903 | 930 | 1097 | 1048 | 1008 | — |
| 19 CF | $C_4$-$C_3$ (16 m %, 1.1 MI)/ PP5520 (75/25) | Super Clear | 55 | 499 | 633 | 883 | 858 | — | — | 738 | — |
| 24 CF | $C_4$-$C_3$ (16 m %, 1.1 MI)/ PPDN6016 (75/25) | Super Clear | 23 | 694 | 987 | 1033 | — | — | 1210 | 1113 | — |
| 27 CF | $C_4$-$C_3$ (16 m %, 2.4 MI)/ PP5083 (75/25) | Super Clear | 406 | 799 | 859 | — | 1031 | — | 1107 | 1067 | — |
| 29 CF | $C_4$-$C_3$ (16 m %, 1.3 MI)/ PP5820 (75/25) | Super Clear | 526 | 642 | 635 | 694 | — | 817 | — | 857 | — |
| | $C_4$-$C_3$ (11 m %, 1.3 MI) PP5820 (75/25) | Hazy | 150 | 81 | 860 | 927 | 955 | — | 997 | 1075 | — |
| 44 CF | $C_4$-$C_3$ (17 m %, 1.3. MI) PP5820 (75/25) | Super Clear | 297 | 797 | 817 | 798 | 760 | — | 862 | 849 | — |

[1]All films are 1.0-1.2 mil in thickness, chill roll (60° F.) cast.
[2]Sealing conditions: 2 second dwell, 20 spi pressure, two side heated at same temperature and one side with Teflon Cloth. Minimum requirement is 350 g/in.

EXPERIMENT 4

Coextruded Two Layer Cast Film Sealing and Optical Properties

Table 4 is the properties of coated and uniaxially oriented cast polypropylene films. Several $C_4$-$C_3$ copolymer/PP blends are coated with a polypropylene homopolymer, Shell PP DN5051, at layer ratio of 1:3. As indicated in Table 4, among the three blends evaluated, the composition of 75 w% $C_4$-$C_3$ copolymer/25 w% PP5820 does give good optical properties, low heat seal initiation temperature, and good processability for the uniaxial oriented cast polypropylene film.

EXPERIMENT 5

Coextruded Cast Film Sealability and Hot Tack Strength

A comparison was made of room temperature aging hot tack strength and heat seal initiation temperature between $C_4$-$C_3$ (BP) and $C_4$-$C_2$ (BE) copolymers. Table 5 shows that, upon room temperature aging, the BP copolymer results in very minor increase in heat seal initiation temperature.

In addition, the BP copolymer retained excellent (15") hot tack strength even at room temperature aging. In contrast, the commercial BE copolymer exhibited a much greater unacceptable increase in heat seal initiation temperature of 40° F. In addition, the hot tack strength of the BE copolymer *after room temperature aging* is unacceptable at 220° F. (5") and only *minimally* acceptable at 240° F. and above.

Thus, the BP copolymer even after room temperature aging, exhibits only minimal, inconsequential increase in heat seal initiation temperature and retains good hot tack strength at all temperatures, even at temperatures below 240° F.

TABLE 4

PROPERTIES OF COATED AND UNIAXIAL ORIENTED CAST POLYPROPYLENE (UPP) FILM[1]

| Property Coating[3] Material | Relative Clarity (Visual Insp.) | Relative Processability | Heat Seal Strength, g/in width[2] | | | | | | | | |
|---|---|---|---|---|---|---|---|---|---|---|---|
| | | | 170° F. | 180° F. | 190° F. | 200° F. | 220° F. | 240° F. | 260° F. | 280° F. | 300° F. |
| WBS-209 75 w % $C_4$-$C_3$ copolymer/ 25 w % PP5820 + 0.4 phr stearmide | Super Clear | Fair | 69 | 279 | — | 627 | 991 | 1589 | 1613 | — | 1583 |
| 92 w % $C_4$-$C_3$ copolymer + 0.4 w % Stearmide + 7 w % PP5820 | Clear | Tacky | 1042 | 1361 | — | 1623 | 1751 | 2003 | 1504 | — | 2314 |
| $C_4$-$C_3$ copolymer | Hazy | Tacky | — | — | — | — | 119 | 1353 | 1306 | 1269 | 1156 |
| 30 w % $C_4$-$C_3$/ 70 w % PP5820 | Clear | OK | Does not give good seal (>350 g/in) at temp. <270° F. | | | | | | | | |
| 30 w % $C_4$-$C_3$/ 70 w % PPDN6018 | Clear | OK | Does not give good seal (>350 g/in) at temp. <280° F. | | | | | | | | |
| OOP Film[4] - control | Clear | OK | Does not give good seal at temp <270° F. | | | | | | | | |

[1]All films were 1.7-2.0 mils in thickness. One side coating layer is about 35% of the total thickness. The substrate is Shell PPDN5051 propylene homopolymer.
[2]Sealing conditions: 2 sec. dwell, 20 psi pressure, two side heated at same temperature and one side with Teflon cloth. Minimum requirement is 350 g/in.
[3]$C_4$-$C_3$ copolymer is 16 m % $C_3$= and 1.3 MI.
[4]Coated with Arco Dypro 431 $C_3$=-$C_2$= random copolymer.

TABLE 5

COMPARISON HOT TACK STRENGTH AND HEAT SEAL
INITIATION TEMPERATURE (HSIT) BETWEEN BUTENE-1-PROPYLENE COPOLYMER (BP) AND
BUTENE-1-ETHYLENE (BE) COPOLYMER ON UNIAXIAL ORIENTED (UPP) FILM UPON ROOM TEMPERATURE

| Property Coating Material | HSIT, °F. As Fabricated[4] | Room T. Aged[5] | HOT TACK STRENGTH, IN WATER AT TEMPERATURE, °F. ||||||
|---|---|---|---|---|---|---|---|---|
| | | | 220 || 240 || 260 ||
| | | | Fabricated | Rm T Aged | Fabricated | Rm T Aged | Fabricated | Rm T Aged |
| BP + 40% PE[2] | 170 | 180 | 15 | 15 | 15 | 15 | 15 | 15 |
| BE + 33% PE[3] | 190 | 230 | 15 | 5 | 15 | 10 | 15 | 12.5 |

[1] Based on 1.25 mil coextended cast film using Shell PP DX5096 as substrate.
[2] BP is a Shell experimental butene-1-propylene copolymer at $C_3$ = 20 m %, and MI (190° C.) = 1.8. PE is a propylene-ethylene copolymer at $C_2$ = 5 w % and MI (230° C.) = 3 (known as Arco Dypro W431).
[3] BE is a butene-1-ethylene copolymer at $C_2$ = 1.5 m %, and MI (190° C.) = 2.
[4] Measured at less than 24 hours and greater than 8 hours after fabrication.
[5] Measured at greater than 7 days room temperature aging.

What we claim as the invention:

1. A room temperature aged cast polymer film having good hot tack, a low heat sealing temperature and high clarity comprising:
   a polypropylene or polypropylene-based copolymer or blend as a substrate or core layer; and
   a polymer blend as a surface layer, wherein said polymer blend comprises a butene-1 propylene copolymer having a propylene content of from about 10% by weight to about 25% by weight.

2. The polymer film of claim 1, wherein said propylene content of said butene-1 propylene copolymer is from about 17% by weight to about 23% by weight.

3. The polymer film of claim 1, wherein said propylene content of said butene-1 propylene copolymer is preferably about 20% by weight.

4. The polymer film of claim 1, wherein the melt index (based on ASTM 1238, condition "E" at 190° C.) of said butene-1 propylene copolymer is from about 0.25 to about 4.0.

5. A room temperature aged cast polymer film having good hot tack, a low heat sealing temperature and high clarity comprising:
   a polypropylene or polypropylene-based copolymer or blend as a substrate or core layer; and
   a polymer blend as a surface layer, wherein said polymer blend comprises a butene-1 propylene copolymer having a propylene content of from about 17% by weight to about 23% by weight.

6. The polymer film of claim 5, wherein said propylene content of said butene-1 propylene copolymer is preferably about 20% by weight.

7. The polymer film of claim 5, wherein the melt index of said butene-1 propylene copolymer is from about 0.25 to about 4.0.

8. A room temperature aged cast polymer film having good hot tack, a low heat sealing temperature and high clarity, comprising:
   a polypropylene or polypropylene-based copolymer or blend as a substrate or core layer; and
   a polymer blend as a surface layer, wherein said polymer blend comprises a butene-1-propylene copolymer having a propylene content of preferably about 20% by weight.

9. The polymer film of claim 8, wherein the melt index of said butene-1-propylene copolymer is from about 0.25 to about 4.0.

10. A room temperature aged cast polymer film having good hot tack, a low heat sealing temperature and high clarity, comprising:
    a polypropylene blend wherein said polymer blend comprises a butene-1-propylene copolymer having a propylene content of preferably about 20% by weight and wherein the melt index of said butene-1-propylene copolymer is from about 0.25 to about 4.0.

* * * * *